United States Patent
Lopez et al.

(10) Patent No.: US 10,757,426 B2
(45) Date of Patent: Aug. 25, 2020

(54) METHOD AND APPARATUS FOR PROCESSING IMAGE DATA

(71) Applicant: INTERDIGITAL VC HOLDINGS, INC., Wilmington, DE (US)

(72) Inventors: Patrick Lopez, Livré sur Changeon (FR); Fabrice Leleannec, Mouazé (FR); Yannick Olivier, Thorigné Fouillard (FR); David Touze, Rennes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 15/328,043

(22) PCT Filed: Jul. 20, 2015

(86) PCT No.: PCT/EP2015/066545
§ 371 (c)(1),
(2) Date: Jan. 22, 2017

(87) PCT Pub. No.: WO2016/012396
PCT Pub. Date: Jan. 28, 2016

(65) Prior Publication Data
US 2017/0223366 A1 Aug. 3, 2017

(30) Foreign Application Priority Data

Jul. 22, 2014 (EP) .................... 14306184

(51) Int. Cl.
*H04B 1/66* (2006.01)
*H04N 19/186* (2014.01)
(Continued)

(52) U.S. Cl.
CPC ......... *H04N 19/186* (2014.11); *H04N 19/117* (2014.11); *H04N 19/124* (2014.11);
(Continued)

(58) Field of Classification Search
CPC .... H04N 19/186; H04N 19/124; H04N 19/36; H04N 19/44
(Continued)

(56) References Cited

U.S. PATENT DOCUMENTS

| | | |
|---|---|---|
| 5,144,420 A | 9/1992 | Omuro |
| 5,959,696 A | 9/1999 | Hwang |

(Continued)

FOREIGN PATENT DOCUMENTS

| | | |
|---|---|---|
| CN | 101138248 | 3/2008 |
| JP | 2007295415 | 11/2007 |

(Continued)

OTHER PUBLICATIONS

Wilt, Adam, HPA Tech Retreat 2014—Day 5, Feb. 22, 2014, DVINFO.net, pp. 5-6 (Year: 2014).*

(Continued)

*Primary Examiner* — Joseph G Ustaris
*Assistant Examiner* — Matthew David Kim
(74) *Attorney, Agent, or Firm* — Invention Mine LLC

(57) ABSTRACT

The invention concerns scaling color difference components prior to encoding in order to extend the dynamic range. In one embodiment the color difference components are encoded prior to quantization. In another embodiment the color difference components are encoded after quantization. A decoder is configured to process data representative of the gain factor for a decoding process.

28 Claims, 8 Drawing Sheets

(51) Int. Cl.
*H04N 19/124* (2014.01)
*H04N 19/36* (2014.01)
*H04N 19/117* (2014.01)
*H04N 19/136* (2014.01)
*H04N 19/44* (2014.01)

(52) U.S. Cl.
CPC ........... *H04N 19/136* (2014.11); *H04N 19/36* (2014.11); *H04N 19/44* (2014.11)

(58) Field of Classification Search
USPC .......................................... 375/240
See application file for complete search history.

(56) References Cited

U.S. PATENT DOCUMENTS

| | | | |
|---|---|---|---|
| 7,812,870 | B2 | 10/2010 | Utz et al. |
| 8,208,038 | B2 | 6/2012 | Wakagi et al. |
| 2009/0092326 | A1 | 4/2009 | Fukuhara et al. |
| 2010/0046612 | A1 | 2/2010 | Sun et al. |
| 2014/0003497 | A1 | 1/2014 | Sullivan et al. |
| 2014/0086318 | A1* | 3/2014 | Kerofsky ............. H04N 11/004 375/240.12 |
| 2015/0222913 | A1* | 8/2015 | Sato ..................... H04N 19/136 375/240.25 |
| 2016/0105687 | A1* | 4/2016 | Deshpande ............ H04N 19/70 375/240.25 |
| 2016/0156915 | A1* | 6/2016 | Choi ...................... H04N 19/46 375/240.08 |
| 2016/0165256 | A1* | 6/2016 | Van Der Vleuten ..... H04N 9/68 375/240.01 |

FOREIGN PATENT DOCUMENTS

| | | | |
|---|---|---|---|
| JP | 2007295415 A | * | 11/2007 |
| WO | WO2010104624 | | 9/2010 |

OTHER PUBLICATIONS

Boitard Ronan et al. "Evaluation of color encodings for high dynamic rangepixels" Proceeding of the SPIE, Vol. 9394, id. 93941k 9 pp., 2015.
Lasserre et al: "New HDR video coding results"Joint Collaborative Team on Video Coding (JCT-VC) of ITU-T SG 16 WP 3 and ISO/IEC JTC 1/SC 29/WG 11 17th Meeting: Velencia, ES, Mar. 27, 2014.
www.dvinfo.net/article/show_reports/hpa-tech-retreat2014-day-5.html, retrieved on Apr. 15, 2019, Adam Wilt: "HPA Tech Retreat 2014—Day 5", Feb. 22, 2014, pp. 1-11.
Chad Fogg et al., "Indication of SMPTE 2084 and 2085 and carriage of 2086 metadata in HEVC", Joint Collaborative Team on Video Coding (JCT-VC) of ITU-T SG 16 WP 3 and ISO/IEC JTC 1/SC 29/WG 11 16th Meeting: San Jose, US, Jan. 9-17, 2014.

* cited by examiner

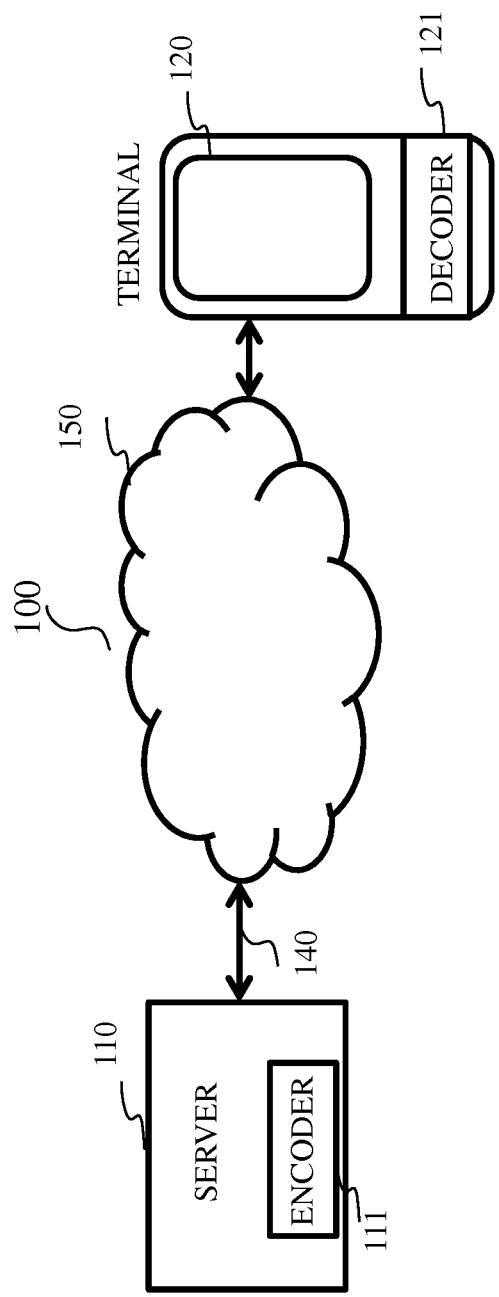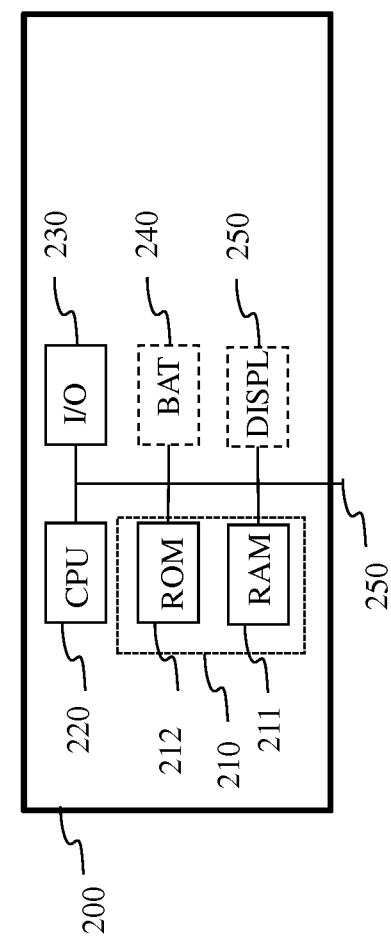

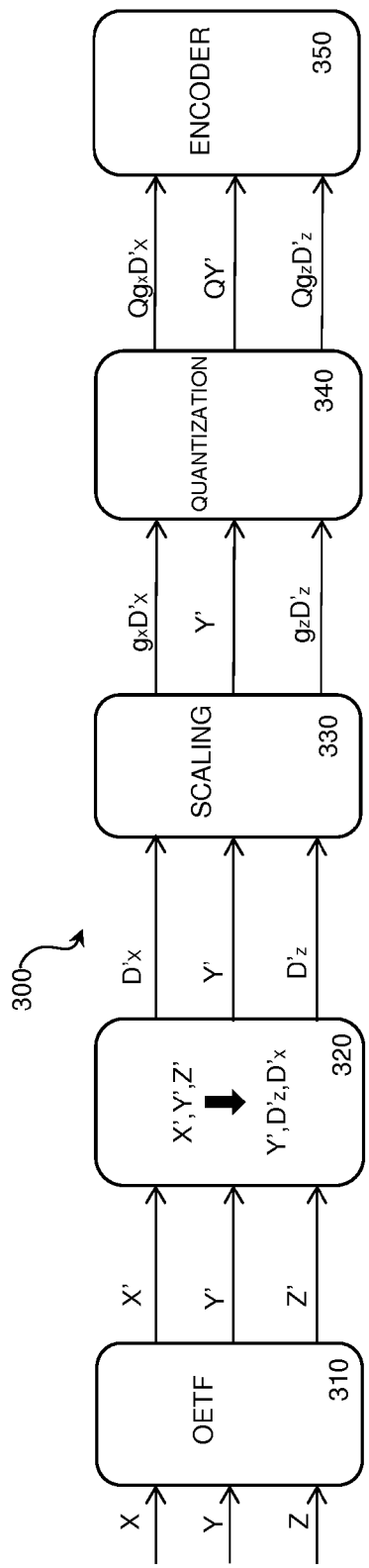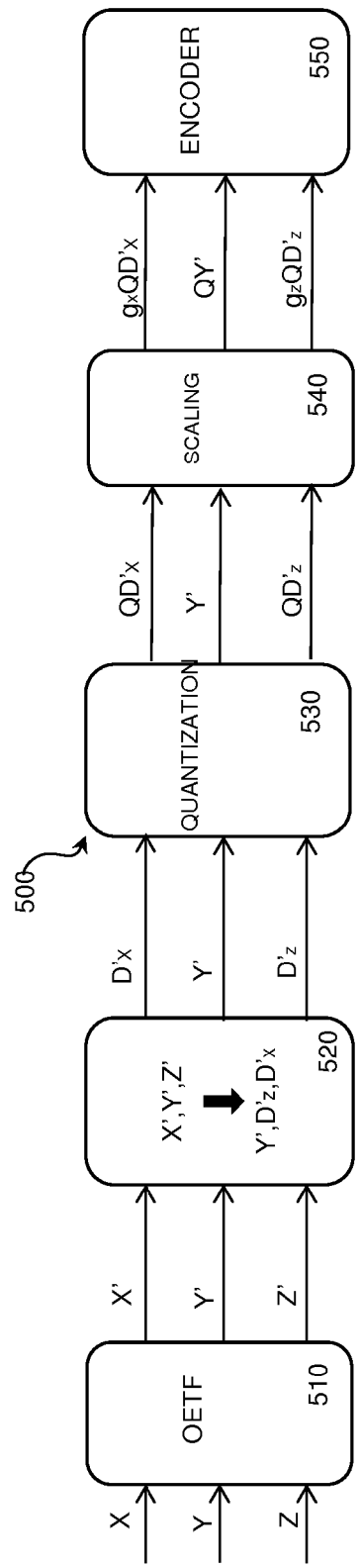

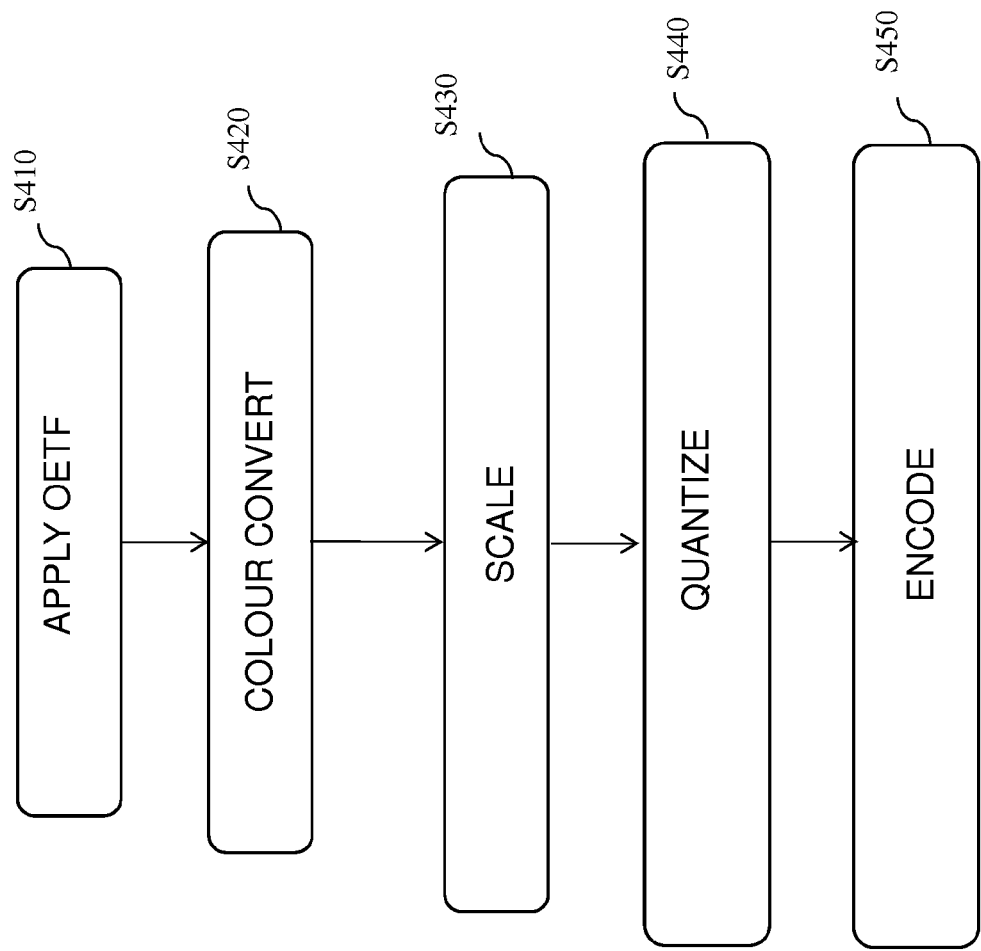

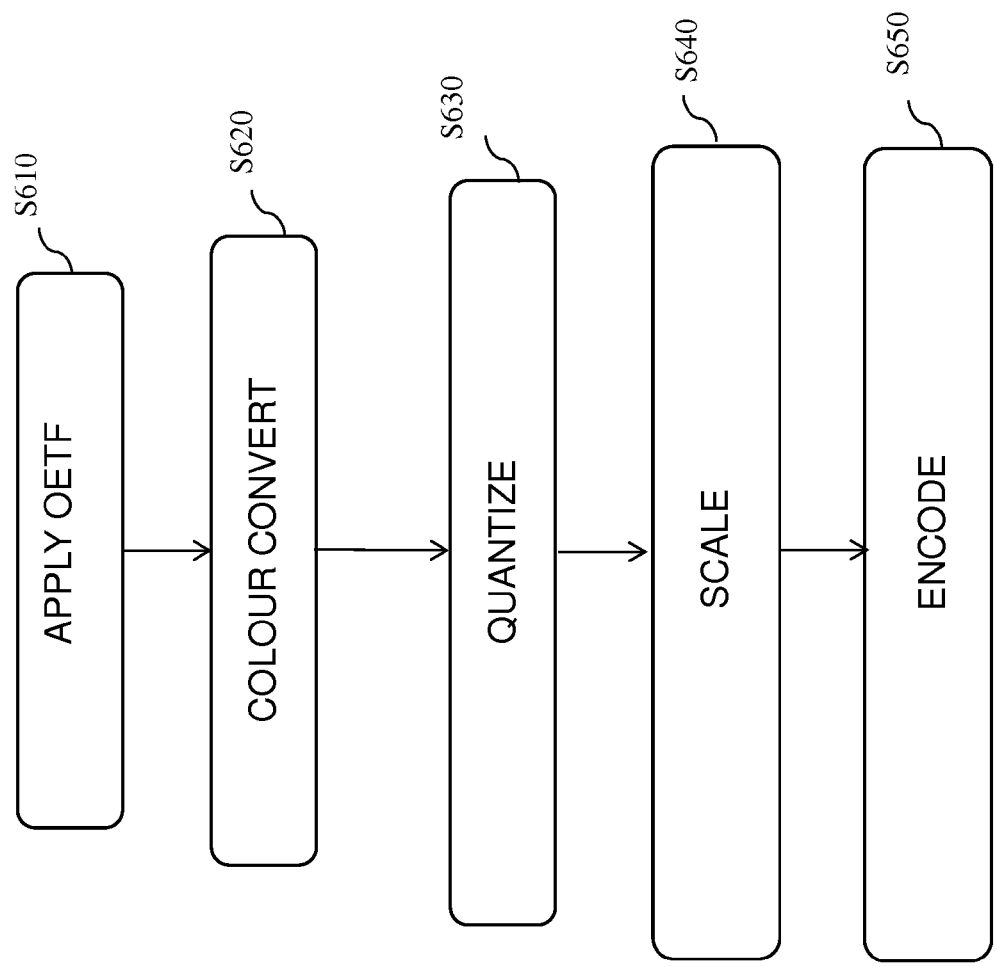

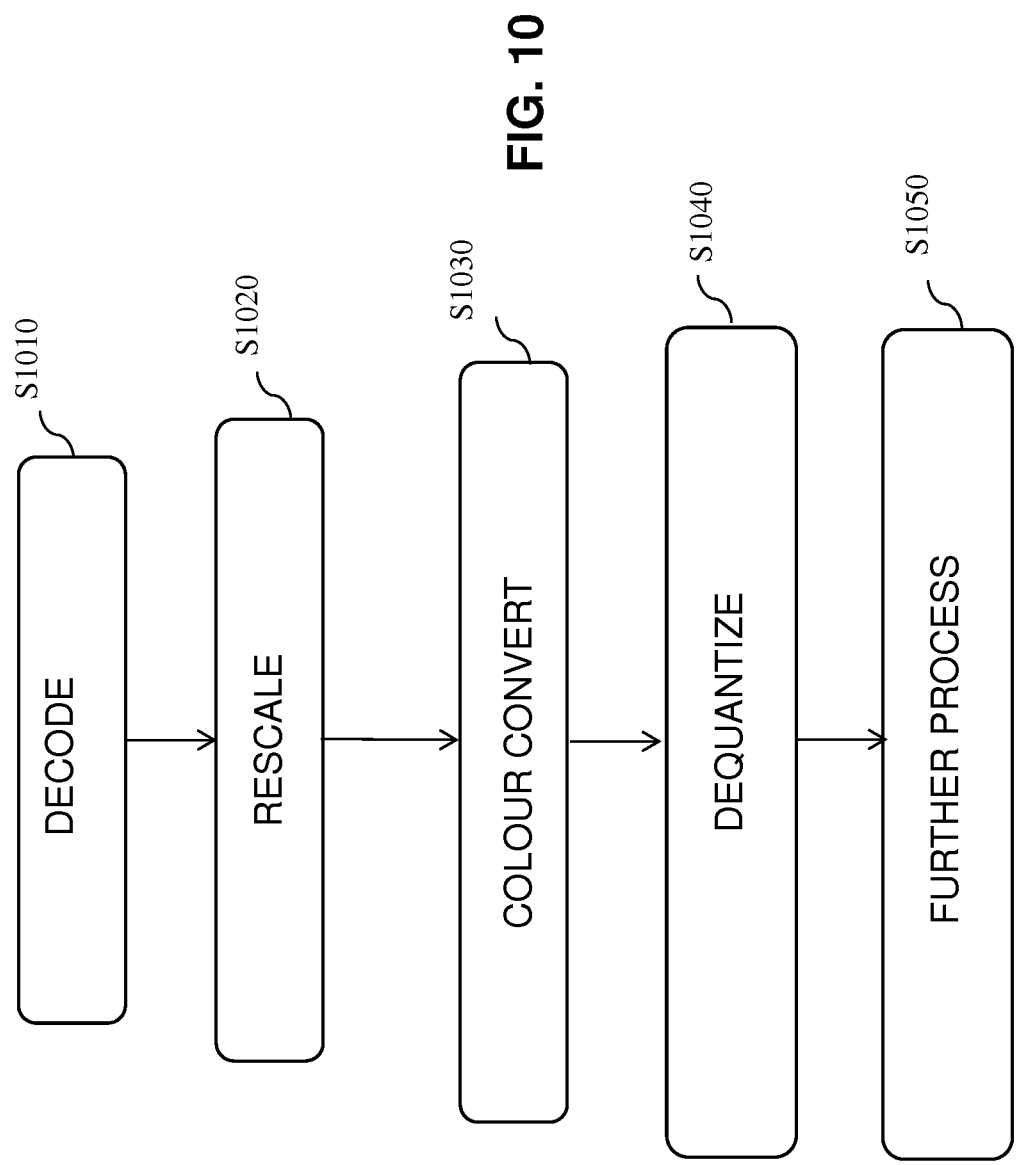

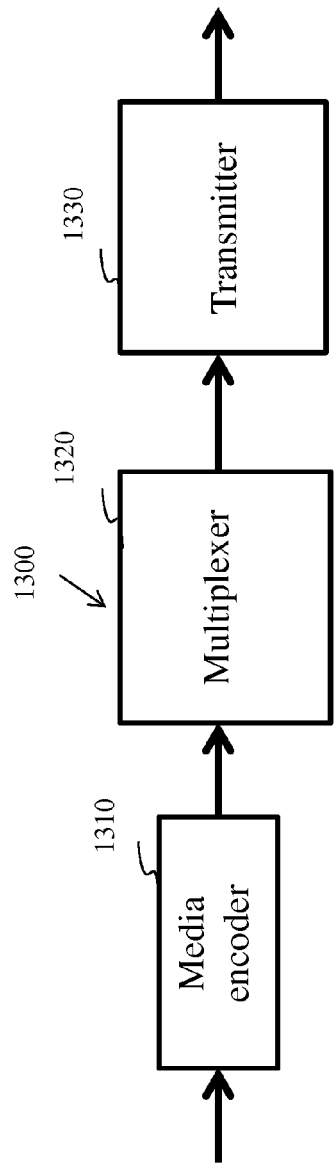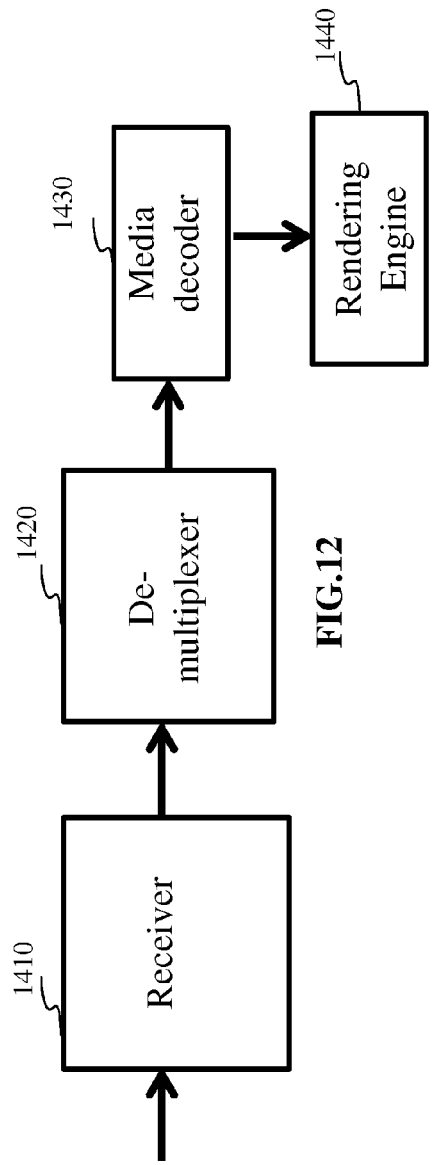

METHOD AND APPARATUS FOR PROCESSING IMAGE DATA

This application claims the benefit, under 35 U.S.C. § 365 of International Application PCT/EP2015/066545, filed Jul. 20, 2015, which was published in accordance with PCT Article 21(2) on Jan. 28, 2016, in English, and which claims the benefit of European patent application No. 14306184.4, filed Jul. 22, 2014. The European and PCT applications are expressly incorporated by reference herein in their entirety for all purposes.

TECHNICAL FIELD

This invention relates to a method and a device for processing image data. Particularly, but not exclusively the invention relates to the encoding of color-difference components and the decoding of color-difference components.

BACKGROUND

Images, such as images captured by digital cameras or computer generated images contain color information defining the color characteristics of each pixel or a group of pixels. Such color information can be represented as color components defining color in a color space. Color components can, for example, represent the intensity of a color as a measure of luma brightness and chroma color deviations from neutral grayscale color toward blue or red (YUV) for or as a measure of red, green, or blue light component intensity (RGB). A YUV model generally defines a color space in terms of one luma (Y) and two chrominance (UV) components. Generally Y represents the luma component (brightness) and U and V are the chrominance (color) or chroma components.

The XYZ color space is an international standard developed by the CIE (Commission Internationale de l'Eclairage). This color model is based on three primaries, XYZ, and all visible colors are represented using positive values of X, Y, and Z. The Y primary is defined to match closely to luminance, while X and Z primaries give color information.

High dynamic range imaging (also referred to as HDR or HDRI) enables a greater dynamic range of luminance between light and dark areas of a scene, and a greater range of color gamut compared to traditional low dynamic range (LDR) images. This is achieved in HDR imaging by extending the signal representation to a wider dynamic range in order to provide high signal accuracy across the entire range. In HDR images, color component values of pixels are usually represented with a greater number of bits (for example from 16 bits to 64 bits) including in floating-point format (for example 32-bit or 16-bit for each component, namely float or half-float), the most popular format being openEXR half-float format (16-bit per RGB component, i.e. 48 bits per pixel) or in integers with a long representation, typically at least 16 bits. Such ranges correspond to the natural sensitivity of the human visual system. In this way HDR images more accurately represent the wide range of luminance and color found in real scenes thereby providing more realistic representations of the scene.

In order to reduce the amount of memory required for storage of color information, and in particular of HDR color information, and to reduce bandwidth usage in transmission, many techniques exist for compressing color information, of image data into smaller, more manageable data sizes.

For example, the SMPTE 2085 standard defines YDzDx color-difference encoding to be used for high dynamic range XYZ signals. Color information, represented by nonlinearly encoded X', Y' and Z' values is transformed to Y', D'z and D'x color-difference signals. The chroma signal D'z is defined as a weighted difference between components Z' and Y', and D'x is a weighted difference between color components X' and Y'. The luminance signal Y' is unaltered by the transformation. The SMPTE 2085 standard defines the conversion from X'Y'Z' to Y'D'ZD'X and the conversion from Y'D'ZD'X to X'Y'Z'

The dynamic of the color difference components D'z and D'x depends on the color space used for the content. For instance, in ITU Rec709, D'x varies within the range [−0.135; 0.131] whereas the excursion range is [−0.496; 0.147] when ITU Rec2020 is considered. Thus, the useful dynamic is about 65% of the full range in ITU Rec2020 but only 27% in ITU Rec709. The reduced input data can lead to the introduction of more quantization noise at the encoder input.

The present invention has been devised with the foregoing in mind.

SUMMARY

In a general form the invention concerns applying a gain to color difference components prior to encoding in order to extend the dynamic range According to a first aspect of the invention there is provided a method of encoding image data including color components defining color characteristics of image portions in a color space, the method comprising for at least a portion of an image; obtaining, from the color components of the image portion, color difference components; scaling the color difference components by applying a gain factor to extend their dynamic range; and encoding the scaled color difference components. The gain factor applied to a respective color difference component may be dependent upon the color gamut of the color space.

In an embodiment of the invention, the gain factor applied to a respective color difference component is such that the color difference component is within the range −0.5 to 0.5, the color components (X', Y', Z') from which the color difference components are derived being in the range [0.0, 1.0].

In an embodiment of the invention, scaling of the color difference components is applied prior to quantization of the color difference components.

In an embodiment, scaling of the color difference components is applied after quantization of the color difference components.

In an embodiment, the image portion is a high dynamic range image portion having a bit depth greater than 8 bits.

In an embodiment, the method comprises transmitting data representative of the gain factor applied. For example, the data representative of the gain factor applied is included in a field of Video Usability Information Data indicating the color gamut used may for instance be included in a matrix_coeff field of Video Usability Information.

According to a second aspect of the invention there is provided a method for decoding image data including color components defining color characteristics of image portions in a color space, the method comprising for at least a portion of an image; decoding a received data bitstream; obtaining, from the decoded bitstream, color difference components; rescaling the color difference components by applying a rescaling factor corresponding to a gain factor applied to the color difference components prior to encoding; and processing the rescaled color difference components to obtain corresponding color components of the image portion. The gain factor applied to a respective color difference component may be dependent upon the color gamut of the color space.

In an embodiment the method includes receiving data representative of the gain factor applied prior to encoding, for example in a field of Video Usability Information. Data indicating the color gamut used may for instance be included in a matrix_coeff field of Video Usability Information.

A third aspect of the invention provides an encoding device for encoding image data including color components defining color characteristics of image portions in a color space, the encoder comprising: a processing module for obtaining, from the color components of the image portion, color difference components; a scaler for scaling the color difference components by applying a gain factor to extend their dynamic range; and an encoder for encoding the scaled color difference components.

The encoding device may be configured to apply the gain factor to a respective color difference component which is dependent upon the color gamut of the color space.

The encoding device may be configured to apply the gain factor to a respective color difference component such that the color difference component is within the range −0.5 to 0.5.

The encoding device may be configured to scale the color difference components prior to quantization of the color difference components In another embodiment the encoding device may be configured to scale the color difference components after quantization of the color difference components In an embodiment, the encoding device comprises a transmitter for transmitting data representative of the gain factor applied. For example, the data representative of the gain factor applied is included in a field of Video Usability Information Data indicating the color gamut used may for instance be included in a matrix_coeff field of Video Usability Information.

A fourth aspect of the invention provides a decoding device for decoding image data including color components defining color characteristics of image portions in a color space, the decoder comprising; a decoder for decoding a received bitstream a processing module for obtaining, from the decoded bitstream, color difference components; a rescaler for rescaling the color difference components by applying a rescaling factor corresponding to a gain factor applied to the color difference components prior to encoding; and an imager processor for processing the rescaled color difference components to obtain corresponding color components of the image portion. The gain factor applied to a respective color difference component may be dependent upon the color gamut of the color space.

The decoding device may be configured to receive data representative of the gain factor applied prior to encoding, for example in a field of Video Usability Information. Data indicating the color gamut used may for instance be included in a matrix_coeff field of Video Usability Information.

A fifth aspect of the invention provides data package comprising
encoded image data including color components defining color characteristics of image portions in a color space, the image data being encoded according to the method of any embodiment of the first aspect of the invention; data representative of a gain factor applied to color difference components of the image data prior to encoded to extend the dynamic range.

A further aspect of the invention provides an electronic device comprising
memory, one or more processors; and one or more modules stored in the memory and configured for execution by the one or more processors, the one or more modules including instructions for encoding image data including color components defining color characteristics of image portions in a color space, comprising:
obtaining, from the color components of the image portion, color difference components;
scaling the color difference components by applying a gain factor to extend their dynamic range; and
encoding the scaled color difference components. The gain factor applied to a respective color difference component may be dependent upon the color gamut of the color space.

A further aspect of the invention provides an electronic device comprising
memory, one or more processors; and one or more modules stored in the memory and configured for execution by the one or more processors, the one or more modules including instructions for decoding image data including color components defining color characteristics of image portions in a color space, comprising:
decoding a received bitstream
obtaining, from the decoded bitstream, color difference components; and
rescaling the color difference components by applying a rescaling factor corresponding to a gain factor applied to the color difference components prior to encoding; and
processing the rescaled color difference components to obtain corresponding color components of the image portion.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system'. Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RE signal.

BRIEF DESCRIPTION OF THE DRAWINGS

Embodiments of the invention will now be described, by way of example only, and with reference to the following drawings in which:

FIG. 1 is a block diagram of an example of a data communication system in which one or more embodiments of the invention can be implemented;

FIG. 2 is a block diagram of an example of an image processing device in which one or more embodiments of the invention can be implemented;

FIG. 3 is a block diagram of an encoding device in accordance with a first embodiment of the invention;

FIG. 4 is a flow chart illustrating steps of an encoding method in accordance with the first embodiment of the invention;

FIG. 5 is a block diagram of an encoding device in accordance with a second embodiment of the invention;

FIG. 6 is a flow chart illustrating steps of an encoding method in accordance with the second embodiment of the invention;

FIG. 10 is a flow chart illustrating steps of a decoding method in accordance with the second embodiment of the invention;

FIG. 11 is a block diagram of an example of a reception device in which one or more embodiments of the invention can be implemented; and FIG. 12 is a block diagram of another example of a reception device in which one or more embodiments of the invention can be implemented.

DETAILED DESCRIPTION

Figure 7:
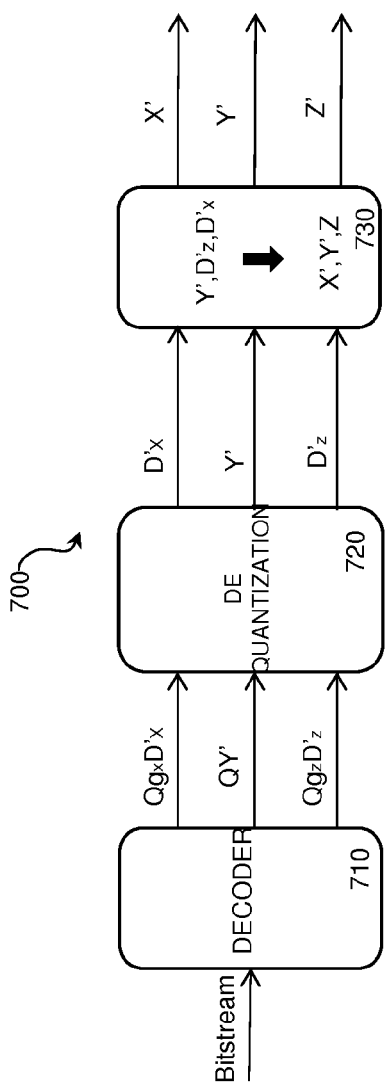
FIG. 7 is a block diagram of a decoding device in accordance with a first embodiment of the invention.

FIG. 1 schematically illustrates an example of a data communication system in which one or more embodiments of the invention may be implemented. Although a streaming scenario is considered in the illustrated example, it will be appreciated that data transfer between two devices may be performed using for example a media storage device such as an optical disc or a USB key. In the illustrated example the data communication system 100 comprises a transmission device, for example a server 110, which is operable to transmit data packets of a data stream to a receiving device, for example a client terminal 120, via a data communication network 150. The data communication network 150 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the invention the data communication system may be a digital television broadcast system in which the server 110 transmits the same data content to multiple clients.

The data stream 140 provided by the server 110 comprises a bitstream representing one or more still images or video data comprising a sequence of images. The image data represented in the bitstream may, in some embodiments of the invention, be captured by the transmission device 110 using a camera, stored on the transmission device 110, received by the transmission device 110 from another data provider, or generated at the transmission device 110. The transmission device 110 is provided with an encoder 111 for encoding image data to provide a compressed bitstream for transmission that is a more compact representation of the image data input to the encoder. In one or more embodiments of the invention the encoded image data includes encoded color difference signals representing color information of the image(s).

The client terminal 120 receives the transmitted bitstream 140 and decodes, by means of a decoder 121, the bitstream accordance with embodiments of the invention to render the multimedia data on the client terminal. The client terminal may be fixed device such as a television or computer or a portable electronic device including, but not limited to a portable computer, a handheld computer, a tablet computer, a mobile telephone, a media player, a personal digital assistance or the like.

FIG. 2 is a block diagram schematically illustrating functional components of an image processing device 200 configured to implement at least one embodiment of the present invention. The processing device may comprise an encoder or a decoder for encoding or decoding an image in accordance with embodiments of the invention. The image processing device 200 may be a device such as a microcomputer, a workstation or a portable device such as a smart phone, a tablet or portable computer.

The image processing device 200 includes memory 210, one or more processing units (CPUs) 220, an input/output interface 230 for transfer of data to and from an application. The components of the image processing device 200 communicate over the one or more communication buses 250. Memory 210 may include high speed random access memory (RAM) 211 and read only memory (ROM) 212. ROM 212 stores at least program code and parameters. Algorithms of the methods according to embodiments of the invention may be stored in ROM 212. When switched on, the CPU 220 uploads the program to the RAM 211 and executes the corresponding instructions.

RAM 211 comprises, in a register, the program executed by the CPU 220 and uploaded after switch on of the device 200, input data in a register, intermediate data at different states of the algorithm in a register, and other variables used for the execution of the algorithm in a register.

Memory 210 may include non-volatile memory, such as one or more magnetic disk storage devices, flash memory devices or other non-volatile solid state memory devices. In some embodiments, the memory may further include storage remotely located from the one or more CPUs 220. For example, storage means accessible via an interface and/or a communication network.

In some embodiments, for example in the case where the processing device is a decoding device the device is provided with a display for example a touch sensitive screen, for displaying data and/or serving as a graphical interface with the user, by means of a keyboard or any other user interactive means. In some embodiments the device is provided with a power source such as a battery 1140. According to alternative embodiments, the power source may be external to the device.

In this embodiment, the processing device 200 is a programmable apparatus which uses software to implement the invention. However, alternatively, the processing device may be implemented in hardware (for example, in the form of an Application Specific Integrated Circuit or ASIC), or in a combination of hardware and software.

In FIGS. 3, 5, 7 and 9, the illustrated modules correspond to functional modules, which may or may not correspond to distinguishable physical units. For example, a plurality of such modules may be associated in a unique component or circuit, or correspond to software functionalities. Moreover, a module may potentially be composed of separate physical entities or software functionalities.

FIG. 3 is a schematic block diagram illustrating the functional modules of an encoding device 300 in accordance with a first embodiment of the invention. FIG. 4 is a flow chart setting out steps of a method of encoding in accordance with the first embodiment of the invention.

Input data to the encoding device 300 includes image data. Image data may represent an image or part of an image to be encoded. The color information of the image data is represented in a color space having a color gamut of high dynamic range. Color components define the color information of the image data in the associated color space. In this particular embodiment, the color components are provided in the XYZ format. It will be appreciated however that the invention may be applied to other formats of color components such as for example RGB. In step S410 the OETF (Opto-electronic transfer function) module 310 applies an opto-electronic transfer function to the color components The OETF function compresses the input signal to a limited dynamic, giving more detail in the dark areas of a picture. The transformed color components obtained from color components X, Y and Z are denoted as X', Y' and Z' respectively.

In step S420 color conversion module 320 then performs color conversion on the color component signals X', Y' and Z' output from the OETF module in order to obtain color difference components. The transformed X, Y and Z components are converted to Y', D'z and D'x color-difference signals. Chroma signal D'z is defined as a weighted difference between color components Z' and Y', and color different signal D'x is a weighted difference between color components X' and Y'. The luminance signal Y' is unaltered by the transformation. An example of the color conversion applied is mathematically expressed below. Color difference components D'Z, D'X are expressed as follows:

$$D'_z = \frac{c_1 Z' - Y'}{2.0}$$

$$D'_x = \frac{X' - c_2 Y'}{2.0}$$

$$c_1 = \frac{2763}{2800}$$

$$c_2 = \frac{2741}{2763}$$

where input color components X', Y' and Z' are in the range [0.0, 1.0] and output color difference components D'z and D'x are in the nominal range [−0.5, +0.5].

In step S430 scaling module 330 applies respective gain factors gx and gz to color difference components D'x and D'z in order to extend their corresponding dynamic ranges. The gain factors gx, gz applied are dependent on the color gamut used. In some embodiments the gain factors applied are such that the scaled color difference components gxD'x and gz D'z are within the range [−0.5; 0.5].

An example of gain factors that may be applied for color gamuts Rec709 and Rec2020 is given in Table 1.

TABLE 1

Example of gain factors to be applied on Dz and Dx components

|  |  | Rec709 | Rec2020 |
|---|---|---|---|
| Encoder | D'x | 8 | 4 |
|  | D'z | 3 | 1 |

In step S440, quantization module 340 applies quantization to color difference component Y' and scaled color difference components gxD'x and gz D'z to obtain quantized color difference components QgxD'x, QY' and Q gz D'z In step S450, quantized color difference components QgxD'x, QY' and Q gz D'z are encoded by encoder module 350 into a bit stream representative of the image data.

FIG. 5 is a schematic block diagram illustrating the functional modules of an encoding device 500 in accordance with a second embodiment of the invention. FIG. 6 is a flow chart setting out steps of a method of encoding in accordance with the second embodiment of the invention.

Input data to the encoding device 500 includes image data similar to image data of the first embodiment in which color components of the image data are provided in the XYZ format. The second embodiment differs to the first embodiment of the invention in that scaling is applied to the color difference components after quantization of the color difference components. In an initial step S610 of the method of encoding image data in accordance with the second embodiment of the invention an OETF module 510 applies an opto-electronic transfer function to the color components X, Y, Z to obtain transformed color components denoted as X', Y' and Z' respectively.

In step S620 color conversion module 520 then performs color conversion on the color component signals X', and Z' output from the OETF module in order to obtain color difference components D'z and D'x in the same way as in the first embodiment of the invention. Color component Y' remains unchanged.

In step S630, quantization module 530 applies quantization to color difference component Y' and color difference components D'x and D'z to obtain quantized color difference components QD'x, QY' and Q D'z.

In step S640 scaling module 540 then applies respective gain factors gx and gz to quantized color difference components QD'x and QD'z in order to extend their dynamic ranges.

In step S650, scaled quantized color difference components gxQD'x, QY' and gzQ D'z are encoded by encoder module 550 into a bit stream representative of the image data.

Figure 8:
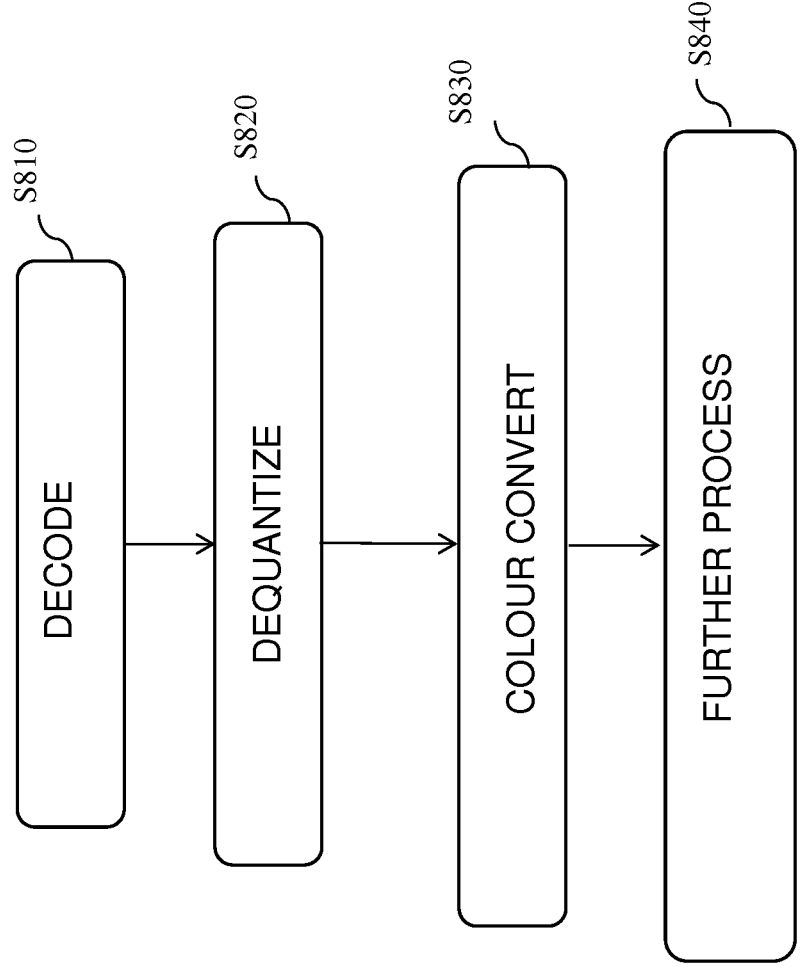
FIG. 8 is a flow chart illustrating steps of a decoding method in accordance with the second embodiment of the invention.

FIG. 7 is a schematic block diagram illustrating the functional modules of a decoding device 700 in accordance with the first embodiment of the invention. FIG. 8 is a flow chart setting out steps of a method of decoding in accordance with the first embodiment of the invention.

Input data to the decoding device 700 includes an encoded bit stream representative of image data encoded in accordance with the first embodiment of the invention.

In step S810 decoding module 710 decodes the incoming bitstream to obtain quantized and scaled color difference components QgxD'x, QY' and Qgz D'z.

In step S820 the quantized and scaled color difference components are dequantized by dequantization module 710 to obtain scaled color difference components gxD'x, Y' and gz D'z.

In step S830 the dequantized color difference components are processed by color conversion module 730 to obtain color components X', Y' and Z' as follows:

$$X' = 2D'_x + c_2 Y'$$

$$Z' = (2D'_z + Y')/c_1$$

where:

$$c_1 = \frac{2763}{2800}$$

-continued $$c_2 = \frac{2741}{2763}$$

where

X', Y' and Z' are in the range [0.0, 1.0] and D'z and D'x are in the range [−0.5, 0.5].

The color components X', Y' and Z' may then be further processed in step S840 in accordance with the requirements of a display device associated with the decoding device.

Figure 9:
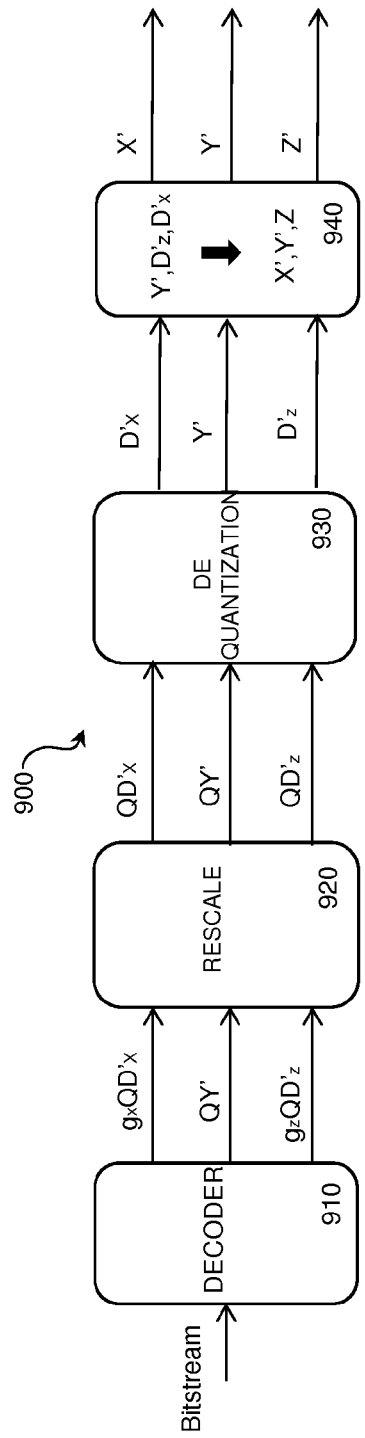
FIG. 9 is a block diagram of a decoding device in accordance with a second embodiment of the invention.

FIG. 9 is a schematic block diagram illustrating the functional modules of a decoding device 900 in accordance with the second embodiment of the invention. FIG. 10 is a flow chart setting out steps of a method of decoding in accordance with the second embodiment of the invention.

Input data to the decoding device 900 includes an encoded bit stream representative of image data encoded in accordance with the second embodiment of the invention.

In step S1010 decoding module 910 decodes the incoming bitstream to obtain the scaled quantized and color difference components gxQD'x, QY' and gz QD'z.

In order to process the scaled quantized and color difference components gxQD'x, and gz QD'z information of the gain factors applied by the encoder gx gz is obtained by the decoding device.

Table 2 illustrates the descaling factors to be applied in the case of the gain factors of Table 1 for color gamuts Rec709 and Rec2020.

TABLE 2

Decoding scaling to be applied on Dz and Dx components

|  |  | Rec709 | Rec2020 |
|---|---|---|---|
| Encoder | Dx | 8 | 4 |
|  | Dz | 3 | 1 |
| Decoder | Dx | ⅛ | ¼ |
|  | Dz | ⅓ | 1 |

The information may be accessed by the decoder in various ways. For example the information may be pre-stored, or the information may be transmitted to the decoder, from the encoder, with the image data or separately to the image data.

In one particular embodiment of the invention Video Usability Information (VUI) may be used to convey the scaling information to the decoder through three fields, color_primaries, transfer_characteristics and matrix_coeffs.

The color_primaries field indicates the chromaticity coordinates of the source primaries in terms of the CIE 1931 definition of x and y as specified in ISO 11664-1. This field may be used to indicate whether the color gamut used is for instance Rec709 or Rec2020.

The transfer_characteristics field indicates the opto-electronic transfer characteristic of the source picture. It may used to describe the conversion of the XYZ to the color difference components to be encoded.

The matrix_coeffs field describes the matrix coefficients used in deriving luma and chroma signals from the green, blue, and red primaries In this embodiment of the invention a new value is added to the matrix_coeffs field. For this specific value of matrix_coeff, the components QD'x and QD'z are scaled at the encoder side according to the color_primaries field, as shown in Table 2.

For instance, if color_primaries=1 (indicating Rec709), QD'x and QD'z are respectively downscaled to D'x and D'Z by a factor of 8 and 3 at the decoder side.

In step S1020 the color difference components are dequantized by dequantization module 910 to obtain scaled color difference components D'x, Y' and D'z In step S1030 the dequantized color difference components are processed by color conversion module 930 to obtain color components X', Y' and Z' as follows:

$$X'=2D'X+c2Y'$$

$$Z'=(2D'Z+Y')/c1$$

where:

$$c_1 = \frac{2763}{2800}$$

$$c_2 = \frac{2741}{2763}$$

Where

Color components X', Y' and Z' are in the range [0.0, 1.0] and difference color components D'z and D'x are in the range [−0.5, 0.5].

The color components X', Y' and Z' may then be further processed in step S1050 in accordance with the requirements of a display device associated with the decoding device.

Embodiments of the invention may find applications in various encoding schemes for video streaming such as for example MPEG encoding.

FIG. 11 illustrates an exemplary transmitting system 1300. The input media data, for example, audio and video data including HDR image data, are encoded at media encoder 1310 in accordance with embodiments of the invention. The encoded data is multiplexed at multiplexer 1320, and transmitted at transmitter 1330. The transmitting system may be used in a typical TV broadcast environment, or may be used in any service providing audiovisual data for streaming or downloading.

FIG. 12 illustrates an exemplary receiving system 1400. The input data of system 1400 may be multimedia data encoded in a bitstream, for example, the output of system 1300. The data is received at receiver 1410, de-multiplexed at de-multiplexer 1420, and then decoded at media decoder 1430 by applying decoding methods in accordance with embodiments of the invention. Decoded packets can be placed in a buffer of de-multiplexer 1420. Rendering Engine 1440 renders the media content, for example to display HDR images in color.

Although the present invention has been described hereinabove with reference to specific embodiments, it will be appreciated that the present invention is not limited to the specific embodiments, and modifications will be apparent to a skilled person in the art which lie within the scope of the present invention.

For instance, while in the foregoing examples an encoding or decoding process including a preprocessing SMPTE color conversion process has been described it will be appreciated that the invention is not limited to any specific process for obtaining color difference components. Other processes applicable to the encoding of color information of images may be applied in the context of the invention. For example the encoding process and complementary decoding process may be based on other encoding/decoding methods involving some encoding strategy optimization step such as MPEG2, MPEG4, AVC, H.263 and the like.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A method of encoding image data including first, second and third color components defining color characteristics of image portions in a color space, the method comprising for at least a portion of an image:
   scaling a first color difference component and a second color difference component obtained from the first, second and third color components of the image portion, by applying a gain factor to extend a respective dynamic range of the first color difference component and the second color difference component, the first color difference component being defined as a weighted difference between the third color component and the first color component and the second color difference component being defined as a weighted difference between the second color component and the first color component, wherein the gain factor applied to a color difference component is dependent upon the color gamut of the color space; and
   encoding the scaled first and second color difference components.

2. A method according to claim 1, wherein the gain factor applied to a respective color difference component is such that the color difference component is within the range −0.5 to 0.5.

3. A method according to claim 1, wherein scaling of the first and second color difference components is applied prior to quantization of the first and second color difference components.

4. A method according to claim 1, wherein scaling of the first and second color difference components is applied after quantization of the first and second color difference components.

5. A method according to claim 1, wherein the image portion is a high dynamic range image portion having a bit depth greater than 8 bits.

6. A method according to claim 1, further comprising transmitting data representative of the gain factor applied.

7. A method according to claim 6, wherein the data representative of the gain factor applied is included in a field of Video Usability Information.

8. A method according to claim 7, wherein data indicating the color gamut used is included in a matrix_coeff field of Video Usability Information.

9. A method for decoding image data including first, second and third color components defining color characteristics of image portions in a color space, the method comprising for at least a portion of an image:
   decoding a received data bitstream;
   obtaining, from the decoded bitstream, a first color difference component and a second color difference component;
   rescaling the first color difference component and the second color difference component by applying a rescaling factor corresponding to a gain factor applied to the first and second color difference components prior to encoding, wherein the gain factor is dependent upon the color gamut of the color space, the first color difference component being defined as a weighted difference between the third color component and the first color component and the second color difference component being defined as a weighted difference between the second color component and the first color component; and
   processing the rescaled first and second color difference components to obtain corresponding color components of the image portion.

10. A method according to claim 9, further comprising receiving data representative of the gain factor applied prior to encoding, in a field of Video Usability Information.

11. An encoder for encoding image data including first, second and third color components defining color characteristics of image portions in a color space, the encoder comprising a processor configured for:
   scaling a first color difference component and a second color difference component, obtained from the first, second and third color components of an image portion, by applying a gain factor to extend their a respective dynamic range of the first color difference component and the second color difference component, the first color difference component being defined as a weighted difference between the third color component and the first color component and the second color difference component being defined as a weighted difference between the second color component and the first color component, wherein the gain factor applied to a color difference component is dependent upon the color gamut of the color space; and
   encoding the scaled first and second color difference components.

12. An encoder according to claim 11, wherein the gain factor applied to a respective color difference component is such that the color difference component is within the range −0.5 to 0.5.

13. An encoder according to claim 11, wherein scaling of the first and second color difference components is applied prior to quantization of the first and second color difference components.

14. An encoder according to claim 11, wherein scaling of the first and second color difference components is applied after quantization of the first and second color difference components.

15. An encoder according to claim 11, wherein the image portion is a high dynamic range image portion having a bit depth greater than 8 bits.

16. An encoder according to claim 11, wherein the processor is further configured for transmitting data representative of the gain factor applied.

17. An encoder according to claim 16, wherein the data representative of the gain factor applied is included in a field of Video Usability Information.

18. An encoder according to claim 17, wherein data indicating the color gamut used is included in a matrix_coeff field of Video Usability Information.

19. A decoder for decoding image data including first, second and third color components defining color characteristics of image portions in a color space, the decoder comprising a processor configured for:
   decoding a received bitstream;
   obtaining, from the decoded bitstream, a first color difference component and a second color difference component;
   rescaling the first color difference component and the second color difference component by applying a rescaling factor corresponding to a gain factor applied to the first and second color difference components prior to encoding, wherein the gain factor is dependent upon the color gamut of the color space, the first color difference component being defined as a weighted difference between the third color component and the first color component and the second color difference component being defined as a weighted difference between the second color component and the first color component; and processing the rescaled first and second color difference components to obtain corresponding color components of an image portion.

20. A decoder according to claim 12, wherein the processor is further configured for receiving data representative of the gain factor applied prior to encoding, in a field of Video Usability Information.

21. A non-transitory computer-readable medium including instructions for causing one or more processors to perform encoding image data including first, second and third color components defining color characteristics of image portions in a color space, the encoding comprising for at least a portion of an image:

scaling a first color difference component and a second color difference component obtained from the first, second and third color components of the image portion, by applying a gain factor to extend a respective dynamic range of the first color difference component and the second color difference component, the first color difference component being defined as a weighted difference between the third color component and the first color component and the second color difference component being defined as a weighted difference between the second color component and the first color component, wherein the gain factor applied to a color difference component is dependent upon the color gamut of the color space; and encoding the scaled first and second color difference components.

22. A non-transitory computer-readable medium according to claim 21, wherein the gain factor applied to a respective color difference component is such that the color difference component is within the range −0.5 to 0.5.

23. A non-transitory computer-readable according to claim 21, wherein scaling of the first and second color difference components is applied prior to quantization of the first and second color difference components.

24. A non-transitory computer-readable medium according to claim 21, wherein scaling of the first and second color difference components is applied after quantization of the first and second color difference components.

25. A non-transitory computer-readable medium according to claim 21, wherein the image portion is a high dynamic range image portion having a bit depth greater than 8 bits.

26. A non-transitory computer-readable medium according to claim 21, wherein the encoding further comprises transmitting data representative of the gain factor applied.

27. A non-transitory computer-readable medium according to claim 26, wherein the data representative of the gain factor applied is included in a field of Video Usability Information.

28. A non-transitory computer-readable medium according to claim 26, wherein data indicating the color gamut used is included in a matrix_coeff field of Video Usability Information.

* * * * *